UNITED STATES PATENT OFFICE.

HENDERSON RYAN, OF SEATTLE, WASHINGTON.

PROCESS OF TREATING STONE.

No. 796,253.  Specification of Letters Patent.  Patented Aug. 1, 1905.

Application filed October 20, 1904. Serial No. 229,279.

*To all whom it may concern:*

Be it known that I, HENDERSON RYAN, a citizen of the United States, and a resident of Seattle, in the county of King and State of Washington, have invented a new and Improved Process of Treating Stone, of which the following is a full, clear, and exact description.

My invention relates to stone, and more particularly to a process for treating building-stone—such as granite, marble, sandstone, &c.—in order to remove stains therefrom and to change and improve the color thereof.

My invention further relates to means for hardening the stone.

My invention also relates to a process for removing stains from various objects—such as stone, wood, and other building materials—and from fabrics, and more particularly stains caused by iron-rust.

I have made the discovery that stones, and especially building-stones, which oftentimes possess an undesirable natural color or have been stained artificially so as to present an unpleasant appearance, may be given a granite-like appearance and also rendered materially harder.

In carrying out my process I make a solution of phosphoric acid, the strength of the solution ranging usually from twenty to eighty-five per cent., according to the character of the stone to which it is to be applied, and subject the stone to the action of this solution for a limited time, generally for a few minutes, and after the solution has done its work for this period of time I wash the stone with water, preferably by subjecting it to the action of a hose, so as to suddenly rinse the residual phosphoric acid from the pores and prevent further action as between the acid and the stone. In the extreme northwestern part of the United States, including Washington, there are certain building-stones which are peculiarly susceptible to the treatment above mentioned. For instance, the so-called "Chuckanut" and "Tenino" stone are typical sandstones, the Chuckanut stone coming from Bellingham and the other from Tenino, a point near Olympia, the quarries being about one hundred miles apart. The two kinds of stone mentioned are greatly improved by my treatment.

The length of time during which the solution is allowed to act upon the stone varies with the strength of the same. A fine color is usually given to the stone by applying a twenty to fifty per cent. solution of phosphoric acid for about half an hour, the time and strength varying with the color desired. It is necessary in most cases to remove the acid as soon as the desired color has been obtained. I find that this treatment not only makes the color of the stone lighter, but gives the stone the appearance of clean granite and seems in a measure to increase the hardness of the face of the stone. I also find that by adding to the solution such soluble coloring-matter as is affected by the action of phosphoric acid I can give almost any sandstone the color desired and can also give variety of color in the same stone. For instance, I can take almost any sandstone and give it a fine blue-gray color by simply dissolving a little indigo or Prussian blue in a solution of muriatic acid, coating the stone, and then following this with a coating of phosphoric acid. The stone is also given a fine blue-gray color if the solution of blue and phosphoric acid be mixed together before applying. By using a small proportion of the blue-stone solution in a solution of phosphoric acid I can produce a very brilliant shade of green, the shade varying with the relative strength of the materials employed. I also find that by coating the stone with a solution of sugar of lead and allowing the same to dry and then applying a coating of the solution of phosphoric acid in this way I can fill the pores to a great extent with lead-crystals and at the same time obtain a beautiful blue-gray color which is somewhat different from any blue gray obtained in any other way. By this process the stone gradually hardens until it acquires practically the hardness of granite. In fact, the simple application of a solution of phosphoric acid will materially harden the stone after a few days' time. I have also found that iron-rust may be removed from fabrics and from woodwork by the application of phosphoric-acid solutions thereto. Interior-finishing woodwork is very easily stained by nails, the rust from which appears to permeate the wood for a considerable distance. The application of a solution of phosphoric acid removes these stains without bleaching or in any manner discoloring the wood. I have also discovered that phosphoric acid will remove lime-stains from interior-finishing woodwork. I have also discovered that phosphoric acid may be used to advantage in laundry-work, and more particularly for the cleansing of white clothes. When it is desired to boil such clothes, I add about a tablespoonful of so-called "fifty-percent" phosphoric acid to two gallons of water, and this causes the clothes to come out much whiter than usual. This treatment also cleanses the clothes from any iron-rust with which they may have been stained. This treatment mercerizes the clothes to a great extent and leaves them with the rich fluffiness of silk. If the clothes have any fruit-stains in them, it is better to use phosphoric acid during the step known as "bluing" in connection with hot water. The use of a very small quantity of bluing is recommended in connection with this step.

Having thus described my invention, I claim as new and desire to secure by Letters Patent—

1. The process herein described of strengthening or otherwise treating and improving the color or quality of stone, which consists in subjecting the same to the action of a solution of phosphoric acid for such length of time as may be required, and afterward washing off the excess of phosphoric acid, if found necessary.

2. The process herein described of strengthening or otherwise treating and improving the color or quality of stone, which consists in subjecting the same to the action of dilute phosphoric acid for a short time, and afterward washing off the excess of phosphoric acid.

3. The process herein described of treating stone, which consists in subjecting the same to the action of a solution of sugar of lead, allowing the same to dry, then applying a solution of phosphoric acid, and finally washing off the excess of sugar of lead and phosphoric acid.

4. The process herein described of treating stone when permeated with iron-rust, which consists in subjecting said stone to the action of phosphoric acid and afterward subjecting said stone to the action of water.

In testimony whereof I have signed my name to this specification in the presence of two subscribing witnesses.

HENDERSON RYAN.

Witnesses:
CLAY ALLEN,
OSBORNE WILLSON.